(12) United States Patent
Yoshizawa et al.

(10) Patent No.: US 10,230,279 B2
(45) Date of Patent: Mar. 12, 2019

(54) ROTARY ELECTRIC MACHINE (71) Applicant: MITSUBISHI ELECTRIC CORPORATION, Chiyoda-ku (JP)

(72) Inventors: Toshiyuki Yoshizawa, Chiyoda-ku (JP); Moriyuki Hazeyama, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 397 days.

(21) Appl. No.: 14/889,980

(22) PCT Filed: May 19, 2014

(86) PCT No.: PCT/JP2014/063190
§ 371 (c)(1),
(2) Date: Nov. 9, 2015

(87) PCT Pub. No.: WO2014/188995
PCT Pub. Date: Nov. 27, 2014

(65) Prior Publication Data
US 2016/0172911 A1    Jun. 16, 2016

(30) Foreign Application Priority Data
May 23, 2013 (JP) ................................ 2013-108672

(51) Int. Cl.
*H02K 1/24* (2006.01)
*H02K 3/32* (2006.01)
*H02K 19/22* (2006.01)

(52) U.S. Cl.
CPC ............. *H02K 1/243* (2013.01); *H02K 3/325* (2013.01); *H02K 19/22* (2013.01)

(58) Field of Classification Search
CPC ......... H02K 19/22; H02K 1/243; H02K 3/325
(Continued)

(56) References Cited

U.S. PATENT DOCUMENTS 3,305,740 A * 2/1967 Shano .................... H02K 3/528
  310/232
6,545,383 B1    4/2003 York
(Continued)

FOREIGN PATENT DOCUMENTS

EP    1 155 948 A2    11/2001
FR    2 256 572 A1    7/1975
(Continued)

OTHER PUBLICATIONS

Translation of foreign document FR 2256572 A1 (Year: 1975).*
International Search Report dated Aug. 5, 2014, in PCT/JP2014/063190 filed May 19, 2014.
(Continued)

*Primary Examiner* — Alex W Mok
(74) *Attorney, Agent, or Firm* — Oblon, McClelland, Maier & Neustadt, L.L.P.

(57) ABSTRACT

In a rotary electric machine, a first pole core body and a second pole core body are produced using solid cores, and first slits are formed on outer circumferential surfaces of a first boss portion and a second boss portion at a uniform pitch in a circumferential direction so as to have groove directions oriented in an axial direction to disrupt pathways of eddy currents that flow on the outer circumferential surfaces of the first boss portion and the second boss portion.

7 Claims, 7 Drawing Sheets (58) Field of Classification Search
USPC .................................................. 310/215, 263
See application file for complete search history.

(56) References Cited

U.S. PATENT DOCUMENTS

| | | | |
|---|---|---|---|
| 7,170,206 B2 * | 1/2007 | Laxenaire | ............... H02K 1/243 |
| | | | 310/263 |
| 7,855,486 B2 | 12/2010 | Hasegawa | |
| 8,004,144 B2 * | 8/2011 | Itoh | ...................... H02K 21/044 |
| | | | 310/263 |
| 2004/0056559 A1 * | 3/2004 | Laxenaire | ............... H02K 1/243 |
| | | | 310/263 |
| 2008/0315716 A1 | 12/2008 | Itoh et al. | |
| 2009/0066175 A1 | 3/2009 | Morita et al. | |

FOREIGN PATENT DOCUMENTS

| | | |
|---|---|---|
| FR | 2 774 524 A1 | 8/1999 |
| FR | 2 939 252 A1 | 6/2010 |
| JP | 2000-69731 A | 3/2000 |
| JP | 3049715 B2 | 6/2000 |
| JP | 2001-327139 A | 11/2001 |
| JP | 2004-229403 A | 8/2004 |
| JP | 2004-236385 A | 8/2004 |
| JP | 2009-27910 A | 2/2009 |
| JP | 2009-071924 A | 4/2009 |
| JP | 2010-119178 A | 5/2010 |

OTHER PUBLICATIONS

Extended Search Report dated Jan. 2, 2017 in European Patent Application No. 14801430.1.

* cited by examiner

ROTARY ELECTRIC MACHINE

TECHNICAL FIELD

The present invention relates to a rotary electric machine such as an automotive alternator, or an automotive alternator-motor, and particularly relates to a Lundell rotor construction.

BACKGROUND ART

Automotive alternators that use Lundell rotors have been used in automobiles for decades. Due to environmental issues in recent years, there is demand for idling reduction systems that stop an engine when a vehicle is stopped such as waiting at a traffic light. Idling reduction systems can be constructed without modifying engine layout significantly by using a conventional alternator as a generator-motor to start the engine after idling reduction. Automotive alternator-motors that are used in idling reduction systems are connected to the engine by means of a belt, and are required to rotate at rotational frequencies that are two to three times an engine rotational frequency. For this reason, pole cores have been produced using solid cores that are made of steel materials to increase the rigidity of the pole core. However, new problems have arisen such as eddy currents flowing through the pole core due to the pole core being produced using a solid core.

In consideration of these conditions, conventional automotive alternator-motors have been proposed in which surfaces of claw-shaped magnetic pole portions of a Lundell rotor are made uneven to reduce eddy currents flowing on the surfaces of the claw-shaped magnetic pole portions (see Patent Literature 1, for example).

Conventional bicycle generators have also been proposed that include: a tubular body that has permanent magnets that are disposed in an annular shape; two stator cores that have a disk portion and a plurality of magnetic pole pieces that extend axially from the disk portion, and that are disposed so as to be coaxial to the tubular body such that mutual magnetic pole pieces are adjacent; core yokes that are disposed between the two stator cores, and that are magnetically coupled to the two stator cores such that magnetic flux passes through axially; and a ring-shaped coil that is disposed around the core yokes, eddy currents being suppressed by disposing slits on the disk portions thereof to improve efficiency (see Patent Literature 2 through 5, for example).

CITATION LIST

Patent Literature

Patent Literature 1: Japanese Patent Laid-Open No. HEI 03-139149 (Gazette)
Patent Literature 2: Japanese Patent Laid-Open No. 2004-229403 (Gazette)
Patent Literature 3: Japanese Patent Laid-Open No. 2004-236385 (Gazette)
Patent Literature 4: Japanese Patent Laid-Open No. 2000-069731 (Gazette)
Patent Literature 5: Japanese Patent Laid-Open No. 2010-119178 (Gazette)

SUMMARY OF THE INVENTION

Problem to be Solved by the Invention

Now, in idling reduction systems, it is necessary for starting of the automotive alternator-motor to be performed promptly in order to restart the engine immediately in response to an engine restarting command to start the vehicle moving. However, because the pole cores are produced using solid cores, eddy currents have been flowing in a direction that impedes the magnetic flux in the pole cores due to changes in flux during build-up of field magnetic flux that is generated by the field coils during starting of the automotive alternator-motor, delaying the field magnetic flux build-up. Thus, for starting of the automotive alternator-motor to be performed promptly, it is necessary to reduce the eddy currents that flow in a direction that impedes the magnetic flux in the pole core.

However, the eddy currents that are reduced in conventional automotive alternator-motors are eddy currents that flow on the surfaces of claw-shaped magnetic pole portions due to changes in magnetic resistance between the facing surfaces of the stator and the rotor during rotation of the rotor. Thus, in conventional automotive alternator-motors, no consideration has been given to reducing eddy currents that flow through the pole core due to changes in flux in the field magnetic flux build-up during starting.

In conventional bicycle generators, eddy currents that arise in the disk portions are reduced by disposing slits on the disk portions, but the eddy currents that arise in the disk portions are eddy currents that are generated due to the alternating-current magnetic flux that interlinks with the stator core due to the permanent magnets of the tubular body rotating, and are not eddy currents that are generated due to changes in flux during the build-up of the field magnetic flux that is generated by the field coils during starting of the generator. Furthermore, the stator cores in conventional bicycle generators are produced by laminating magnetic steel sheets, and are not solid cores. Thus, in conventional bicycle generators, no consideration has been given to reducing eddy currents that are generated in solid cores, or to eddy currents that are generated due to changes in flux during field magnetic flux build-up during starting.

The present applicants have found that eddy currents that flow due to changes in flux in field magnetic flux build-up during starting of an automotive alternator-motor are biased toward outer circumferential surfaces of boss portions of a pole core due to a skin effect, and have succeeded in inventing the present invention.

The present invention aims to solve such problems and an object of the present invention is to provide a rotary electric machine that can achieve prompt restarting and that can also reduce eddy current loss by reducing eddy currents that flow through an outer circumferential surface of a boss portion of a pole core due to changes in flux in field magnetic flux build-up during starting to enable prompt field magnetic flux build-up in response to a restarting command.

Means for Solving the Problem

In order to achieve the above object, according to one aspect of the present invention, there is provided a rotary electric machine including: a rotor including: a pole core that includes: a first pole core body including: a tubular first boss portion; a first yoke portion that is disposed so as to extend radially outward from a first axial end edge portion of the first boss portion; and a plurality of first claw-shaped magnetic pole portions that are each disposed so as to extend toward a second axial end from the first yoke portion and that are arranged at a uniform pitch in a circumferential direction; and a second pole core body including: a tubular second boss portion; a second yoke portion that is disposed so as to extend radially outward from a second axial end edge portion of the second boss portion; and a plurality of second claw-shaped magnetic pole portions that are each disposed so as to extend toward a first axial end from the second yoke portion and that are arranged at a uniform pitch in a circumferential direction, the first pole core body and second pole core body being integrated by being fixed to a shaft that is inserted into central axial positions of the first boss portion and the second boss portion such that the plurality of first claw-shaped magnetic pole portions and the plurality of second claw-shaped magnetic pole portions intermesh alternately, and such that the second axial end surface of the first boss portion and the first axial end surface of the second boss portion are butted together; and a field coil that is housed inside a space that is surrounded by the first boss portion, the second boss portion, the first yoke portion, the second yoke portion, the plurality of first claw-shaped magnetic pole portions, and the plurality of second claw-shaped magnetic pole portions; and a stator that is disposed so as to surround an outer circumference of the rotor so as to have a predetermined air gap interposed. The first pole core body and the second pole core body are produced using solid cores, and first slits are formed on outer circumferential surfaces of the boss portions so as to disrupt pathways of eddy currents that flow on the outer circumferential surfaces of the boss portions.

Effects of the Invention

According to the present invention, the first slits that are formed on the outer circumferential surfaces of the boss portions of the pole cores disrupt pathways of eddy currents that flow on the outer circumferential surfaces of the boss portions in directions that impede magnetic flux due to changes in flux in magnetic flux build-up during starting. Because the eddy currents that impede the magnetic flux are reduced, field magnetic flux build-up is expedited, enabling prompt restarting to be achieved, and also enabling eddy current loss to be reduced.

DESCRIPTION OF EMBODIMENTS

Preferred embodiments of a rotary electric machine according to the present invention will now be explained with reference to the drawings.

Embodiment 1

Figure 1:
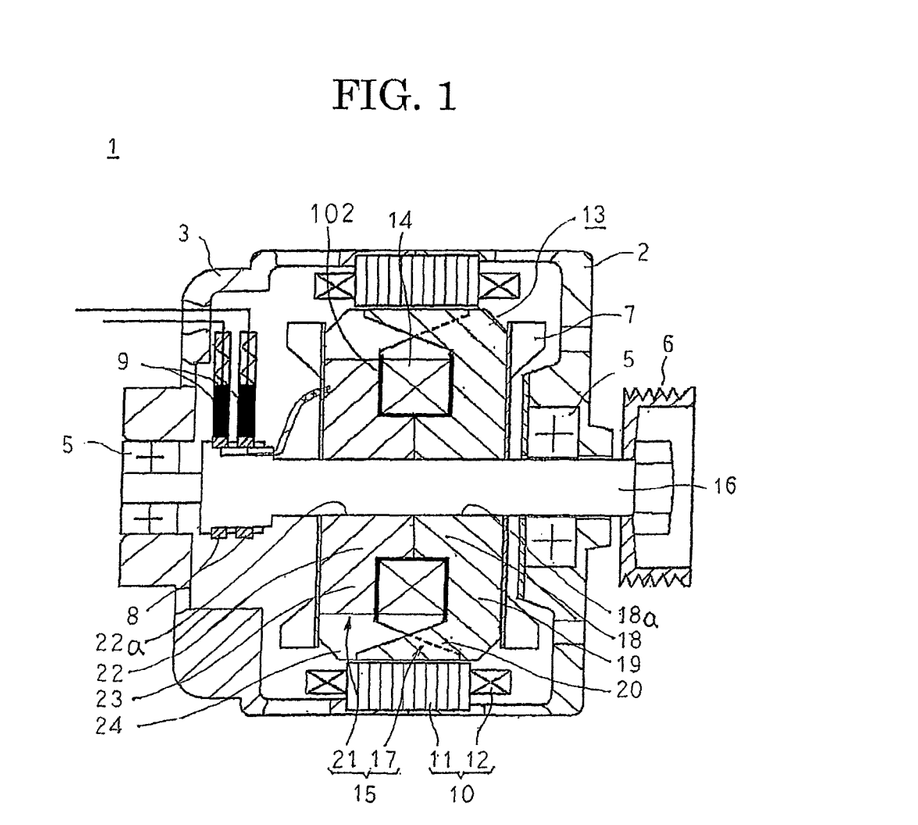
FIG. 1 is a cross section that schematically shows an automotive alternator-motor according to Embodiment 1 of the present invention.
Figure 2:
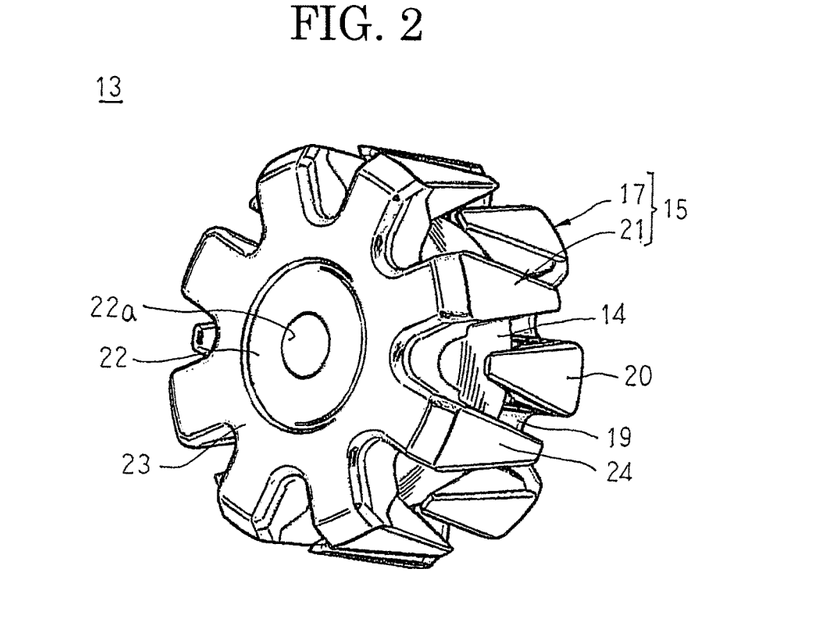
FIG. 2 is an oblique projection that shows a rotor that is used in the automotive alternator-motor according to Embodiment 1 of the present invention.
Figure 3:
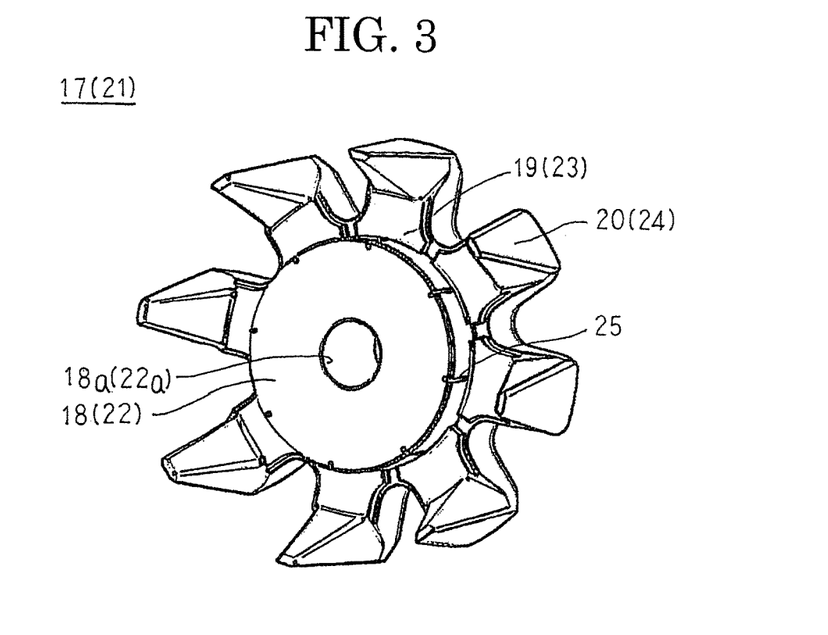
FIG. 3 is an oblique projection that shows a pole core body that constitutes part of a pole core that is used in the automotive alternator-motor according to Embodiment 1 of the present invention.

FIG. 1 is a cross section that schematically shows an automotive alternator-motor according to Embodiment 1 of the present invention, FIG. 2 is an oblique projection that shows a rotor that is used in the automotive alternator-motor according to Embodiment 1 of the present invention, and FIG. 3 is an oblique projection that shows a pole core body that constitutes part of a pole core that is used in the automotive alternator-motor according to Embodiment 1 of the present invention. Moreover, a shaft and fans have been omitted from FIG. 2.

In FIGS. 1 through 3, an automotive alternator-motor 1 that functions as a rotary electric machine includes: a front bracket 2 and a rear bracket 3 that are each made of aluminum in an approximate cup shape; a rotor 13 that is rotatably disposed such that a shaft 16 is supported by means of bearings 5 in the front bracket 2 and the rear bracket 3; a pulley 6 that is fixed to an end portion of the shaft 16 that projects outward through the front bracket 2; fans 7 that are fixed to two axial end surfaces of the rotor 13; a stator 10 that is fixed to the front bracket 2 and the rear bracket 3 so as to surround an outer circumference of the rotor 13 so as to have a constant air gap relative to the rotor 13; a pair of slip rings 8 that are fixed to a rear end of the shaft 16, and that supply current to the rotor 13; and a pair of brushes 9 that are disposed so as to slide on the respective slip rings 8.

Moreover, although not shown, a power circuit portion that converts direct-current power to alternating-current power, or alternating-current power to direct-current power, a field circuit portion that supplies a field current to the field coil of the rotor 13, and a controlling circuit portion that controls the power circuit portion and the field circuit portion, etc., are disposed inside the rear bracket 3. A rotational angle detector that detects a rotational angle of the rotor 13 is also included.

The stator 10 includes: a cylindrical stator core 11; and a stator coil 12 that is mounted to the stator core 11, and that is subjected to magnetic flux from a field coil 14 (described below) that accompanies rotation of the rotor 13.

The rotor 13 includes: a field coil 14 that generates magnetic flux on passage of a field current; a pole core 15 that is disposed so as to cover the field coil 14 and in which magnetic poles are formed by that magnetic flux; and the shaft 16, which is inserted into and fixed to a central axial position of the pole core 15.

The pole core 15 is configured so as to be divided into first and second pole core bodies 17 and 21 that are each prepared by a cold forging manufacturing method using a low carbon steel such as S10C, for example.

The first pole core body 17 has: a first boss portion 18 that is produced into a cylindrical body that has a circular end surface, and in which a shaft insertion aperture 18a is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform pitch circumferentially.

The second pole core body 21 has: a second boss portion 22 that is produced into a cylindrical body that has a circular end surface, and in which a shaft insertion aperture 22a is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform pitch circumferentially.

In addition, as shown in FIG. 3, eight first slits 25 that each have a groove cross-sectional shape that is a rectangular shape and a groove direction oriented in an axial direction are formed on an outer circumferential surface of the first boss portion 18 of the first pole core body 17 at a uniform pitch in a circumferential direction so as to extend from the root of the first yoke portion 19 to a second axial end. These first slits 25 are positioned within projected regions that are obtained by projecting the first claw-shaped magnetic pole portions 20 onto an outer circumferential surface of the first boss portion 18 from radially outside. Similarly, eight first slits 25 that each have a groove cross-sectional shape that is a rectangular shape, and a groove direction oriented in an axial direction, are formed on an outer circumferential surface of the second boss portion 22 of the second pole core body 21 at a uniform pitch in a circumferential direction so as to extend from the root of the second yoke portion 23 to a first axial end. These first slits 25 are positioned within projected regions that are obtained by projecting the second claw-shaped magnetic pole portions 24 onto an outer circumferential surface of the second boss portion 22 from radially outside.

Thus, the first and second pole core bodies 17 and 21 are made into identical shapes, and are fixed to the shaft 16 that has been inserted into the shaft insertion apertures 18a and 22a such that the first and second claw-shaped magnetic pole portions 20 and 24 alternately intermesh and a second end surface of the first boss portion 18 is butted against a first end surface of the second boss portion 22. The field coil 14, which has been wound onto a bobbin 102, is mounted in a space that is surrounded by the first and second boss portions 18 and 22, the first and second yoke portions 19 and 23, and the first and second claw-shaped magnetic pole portions 20 and 24. Furthermore, a vicinity of tip ends of the first and second claw-shaped magnetic pole portions 20 and 24 overlap with the second and first yoke portions 23 and 19, respectively, in the axial direction.

Next, operation of an automotive alternator-motor 1 that is configured in this manner as an electric motor will be explained.

During engine starting, direct-current power is supplied from a battery (not shown) to the power circuit portion by means of an electric power terminal. The controlling circuit portion performs on-off control on each of the switching elements of the power circuit portion to convert the direct-current power into alternating-current power. This alternating-current power is supplied to the stator coil 12 of the stator 10. At the same time, the field circuit portion supplies a field current to the field coil 14 of the rotor 13 by means of the brushes 9 and the slip rings 8 based on commands from the controlling circuit portion, to generate magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles. Driving torque is generated by interlinking between the magnetic flux in the rotor 13 and the electric currents that flow through the stator coil 12. The rotor 13 is driven to rotate by this driving torque. Rotational torque from the rotor 13 is transmitted from the pulley 6 to a crank shaft (not shown) of the engine by means of the belt (not shown) to start the engine.

Next, operation of an automotive alternator-motor 1 that is configured in this manner as a generator will be explained.

When the engine is running, rotational torque from the engine is transmitted from the crank shaft to the shaft 16 by means of the belt and the pulley 6 to rotate the rotor 13. The magnetic flux that is generated by the field coil 14 thereby interlinks with the stator coil 12 of the stator 10 such that a three-phase alternating-current voltage is induced in the stator coil 12. Then, the controlling circuit portion performs on-off control on each of the switching elements of the power circuit portion such that the three-phase alternating-current power that has been induced in the stator coil 12 is converted into direct-current power, and charges the battery.

Now, because magnetomotive force in the field coil 14 is ensured by increasing the number of turns, the number of turns is generally greater in the field coil 14 than in the stator coil 12, making inductance greater. Because of that, field magnetic flux build-up takes longer than in the stator 10, and torque that starts the engine cannot be generated promptly. Furthermore, because the first and second pole core bodies 17 and 21 are produced using solid cores, eddy currents flow in a direction that suppresses the magnetic flux in the first and second boss portions 18 and 22 of the first and second pole core bodies 17 and 21 due to changes in flux during the field magnetic flux build-up. Because of that, the field magnetic flux build-up is delayed, and eddy current loss also arises, raising the temperature of the first and second pole core bodies 17 and 21 and the field coil 14.

These eddy currents flow in an opposite direction to the electric current that flows through the field coil 14 and are biased toward outer circumferential surfaces of the first and second boss portions 18 and 22 of the first and second pole core bodies 17 and 21 due to a skin effect. In Embodiment 1, because the first slits 25 are formed on the outer circumferential surfaces of the first and second boss portions 18 and 22 so as to have groove directions oriented in an axial direction, the first slits 25 disrupt pathways of the eddy currents that flow on the outer circumferential surfaces of the first and second boss portions 18 and 22. Eddy currents that flow through the first and second boss portions 18 and 22 in a direction that suppresses the magnetic flux are reduced thereby, expediting field magnetic flux build-up, and also reducing eddy current loss.

Figure 4:
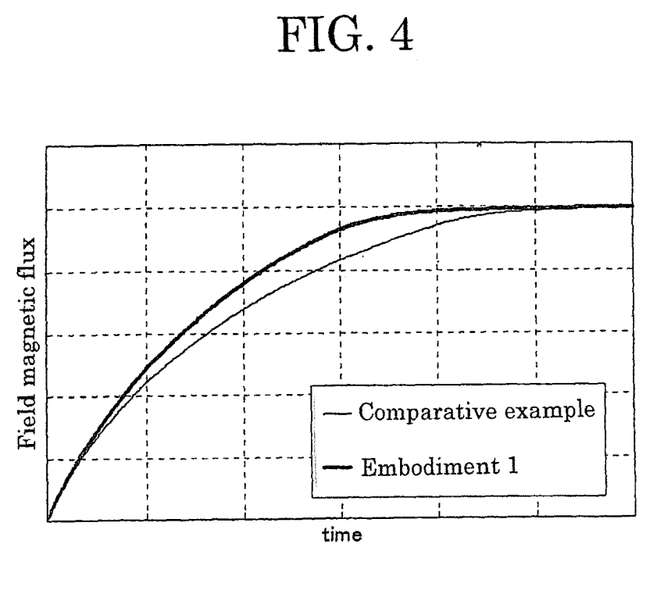
FIG. 4 is a graph that shows measured results of time variation in field magnetic flux during engine starting in the automotive alternator-motor according to Embodiment 1 of the present invention.
Figure 5:
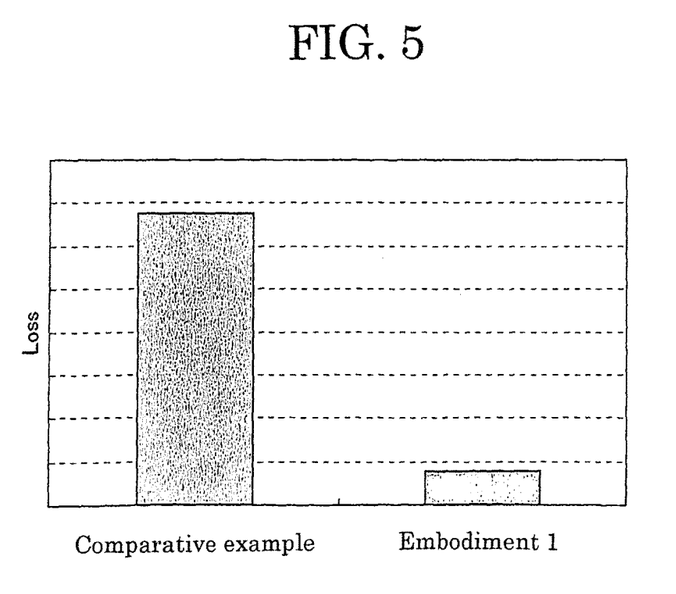
FIG. 5 is a graph that shows calculated results of eddy current loss in the automotive alternator-motor according to Embodiment 1 of the present invention.

Next, in order to confirm the effects according to Embodiment 1, measured results of time variation in field magnetic flux during engine starting are shown in FIG. 4, and calculated results of eddy current loss are shown in FIG. 5. FIG. 4 is a graph that shows measured results of time variation in field magnetic flux during engine starting in the automotive alternator-motor according to Embodiment 1 of the present invention, and FIG. 5 is a graph that shows calculated results of eddy current loss in the automotive alternator-motor according to Embodiment 1 of the present invention. Moreover, in FIGS. 4 and 5, an automotive alternator-motor that was mounted with a rotor that incorporated first and second pole core bodies on which slits were not formed, instead of the rotor 13, was used as a comparative example.

From FIG. 4, it has been possible to confirm that field magnetic flux build-up is expedited by forming the first slits 25 on the first and second boss portions 18 and 22.

Because the automotive alternator-motor 1 expedites the field magnetic flux build-up during starting in this manner, if this automotive alternator-motor 1 is applied to idling reduction systems, the engine can be restarted immediately in response to an engine restarting command to start the vehicle moving.

From FIG. 5, it has been possible to confirm that eddy current loss can be reduced by forming the first slits 25 on the first and second boss portions 18 and 22.

Because the automotive alternator-motor 1 can reduce eddy current loss in this manner, temperature increases in the first and second pole core bodies 17 and 21 and the field coil 14 can be suppressed, enabling increases in copper loss to be suppressed.

An automotive alternator-motor 1 that is mounted to a vehicle is connected to the engine by means of the belt, and rotates at rotational frequencies that are two to three times the engine rotational frequency, depending on the pulley ratio, and sometimes rotates at a rotational frequency of 20,000 rpm. In Embodiment 1, because the first and second pole core bodies 17 and 21 are produced using solid cores, the rigidity of the first and second pole core bodies 17 and 21 is greater. Thus, the occurrence of situations such as the first and second claw-shaped magnetic pole portions 20 and 24 deforming due to centrifugal forces can be avoided even if the rotor 13 rotates at high speed.

In addition, because the first slits 25 are positioned within projected regions that are obtained by projecting the first and second claw-shaped magnetic pole portions 20 and 24 onto outer circumferential surfaces of the first and second boss portions 18 and 22 from radially outside, deterioration in performance of resistance of the first and second claw-shaped magnetic pole portions 20 and 24 to centrifugal forces that results from formation of the first slits 25 can be suppressed.

Now, if consideration is given to the material properties and frequency bands to be used, from a computational expression of skin depth δ (Expression 1), it is desirable for the depth of the first slits 25 to be from 0.5 mm through 5 mm:

$$\delta = 1/\sqrt{(\sigma \mu f \pi)} \qquad \text{(Expression 1)}$$

Here, σ is electric conductivity of the pole core bodies, μ is magnetic permeability of the pole core bodies, and f is frequency.

Embodiment 2

Figure 6:
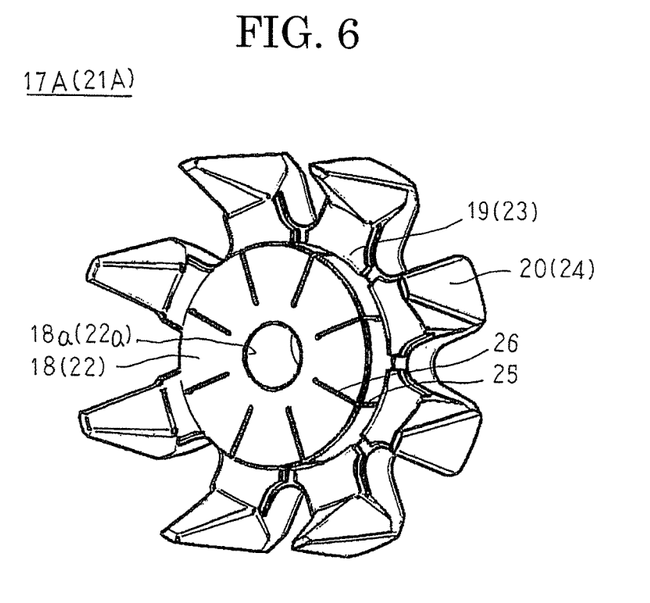
FIG. 6 is an oblique projection that shows a pole core body that constitutes part of a pole core that is used in an automotive alternator-motor according to Embodiment 2 of the present invention.

FIG. 6 is an oblique projection that shows a pole core body that constitutes part of a pole core that is used in an automotive alternator-motor according to Embodiment 2 of the present invention.

In FIG. 6, second slits 26 that each have a groove cross-sectional shape that is a rectangular shape, and a groove direction oriented in a radial direction, are formed on a second end surface of a first boss portion 18 so as to extend from a second axial end of first slits 25 to a vicinity of a shaft insertion aperture 18a. Similarly, second slits 26 that each have a groove cross-sectional shape that is a rectangular shape, and a groove direction oriented in a radial direction, are formed on a first end surface of a second boss portion 22 so as to extend from a first axial end of first slits 25 to a vicinity of a shaft insertion aperture 22a.

Here, a first pole core body 17A and a second pole core body 21A are assembled by butting the second end surface of the first boss portion 18 together with the first end surface of the second boss portion 22. At this point, it is desirable for the second end surface (a butted surface) of the first boss portion 18 and the first end surface (a butted surface) of the second boss portion 22 to be butted so as to be in contact all over, but it is possible that gaps may arise partially between the butted surfaces. Thus, if gaps arise partially between the butted surface, eddy currents may flow due to changes in flux during the field magnetic flux build-up, not only on the outer circumferential surfaces of the first and second boss portions 18 and 22 but also on the butted surfaces due to a skin effect.

In Embodiment 2, the second slits 26 have groove directions oriented in a radial direction, and are formed on the butted surfaces of the first and second boss portions 18 and 22 so as to extend radially inward from the axial end portions of the first slits 25. Thus, the second slits 26 disrupt pathways of the eddy currents that flow on the butted surfaces of the first and second boss portions 18 and 22. Because not only eddy currents that flow on outer circumferential surfaces of the first and second boss portions 18 and 22 but also eddy currents that flow on the butted surfaces of the first and second boss portions 18 and 22 can be reduced thereby, the field magnetic flux build-up during starting is further expedited, and eddy current loss can also be further reduced.

According to Embodiment 2, because the second slits 26 that are formed on the butted surfaces of the first and second boss portions 18 and 22 do not extend to the shaft insertion apertures 18a and 22a, the first and second pole core bodies 17A and 21A can be fixed to the shaft 16 firmly.

Embodiment 3

Figure 7:
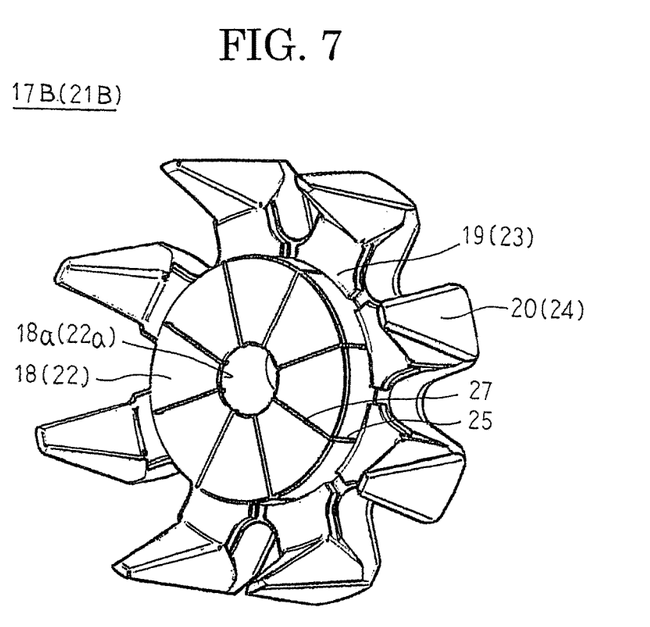
FIG. 7 is an oblique projection that shows a pole core body that constitutes part of a pole core that is used in an automotive alternator-motor according to Embodiment 3 of the present invention.

FIG. 7 is an oblique projection that shows a pole core body that constitutes part of a pole core that is used in an automotive alternator-motor according to Embodiment 3 of the present invention.

In FIG. 7, second slits 27 that each have a groove cross-sectional shape that is a rectangular shape, and a groove direction oriented in a radial direction, are formed on a second end surface of a first boss portion 18 so as to extend from a second axial end of first slits 25 to a shaft insertion aperture 18a. Similarly, second slits 27 that each have a groove cross-sectional shape that is a rectangular shape, and a groove direction oriented in a radial direction, are formed on a first end surface of a second boss portion 22 so as to extend from a first axial end of first slits 25 to a shaft insertion aperture 22a.

Because the second slits 27 that are formed on butted surfaces of the first and second boss portions 18 and 22 of first and second pole core bodies 17B and 21B are formed so as to extend from axial end portions of the first slits 25 to the shaft insertion apertures 18a and 22a, the butted surfaces of the first and second boss portions 18 and 22 are separated in a circumferential direction by the second slits 27. Thus, the second slits 27 reliably disrupt the pathways of the eddy currents that flow on the butted surfaces of the first and second boss portions 18 and 22, enabling eddy currents to be further reduced.

Embodiment 4

Figure 8:
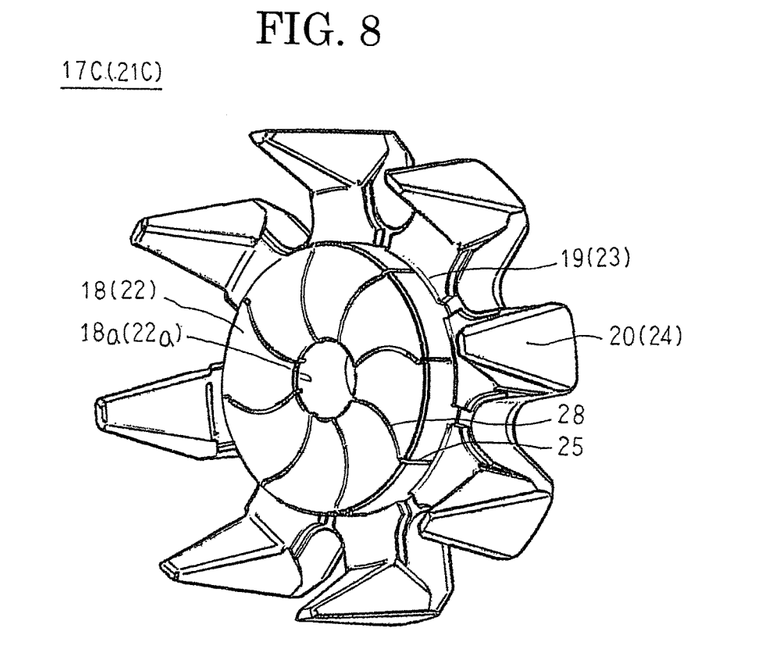
FIG. 8 is an oblique projection that shows a pole core body that constitutes part of a pole core that is used in an automotive alternator-motor according to Embodiment 4 of the present invention.

FIG. 8 is an oblique projection that shows a pole core body that constitutes part of a pole core that is used in an automotive alternator-motor according to Embodiment 4 of the present invention.

In FIG. 8, second slits 28 that each have a groove cross-sectional shape that is a rectangular shape are formed in arc shapes on a second end surface of a first boss portion 18 so as to extend from a second axial end of first slits 25 to a shaft insertion aperture 18a. Similarly, second slits 28 that each have a groove cross-sectional shape that is a rectangular shape, and a groove direction oriented in a radial direction, are formed in arc shapes on a first end surface of a second boss portion 22 so as to extend from a first axial end of first slits 25 to a shaft insertion aperture 22a.

Because the second slits 28 that are formed on butted surfaces of the first and second boss portions 18 and 22 of first and second pole core bodies 17C and 21C are formed so as to extend from axial end portions of the first slits 25 to the shaft insertion apertures 18a and 22a, the butted surfaces of the first and second boss portions 18 and 22 are separated in a circumferential direction by the second slits 28. Thus, the second slits 28 reliably disrupt the pathways of the eddy currents that flow on the butted surfaces of the first and second boss portions 18 and 22, enabling eddy currents to be further reduced.

Embodiment 5

Figure 9:
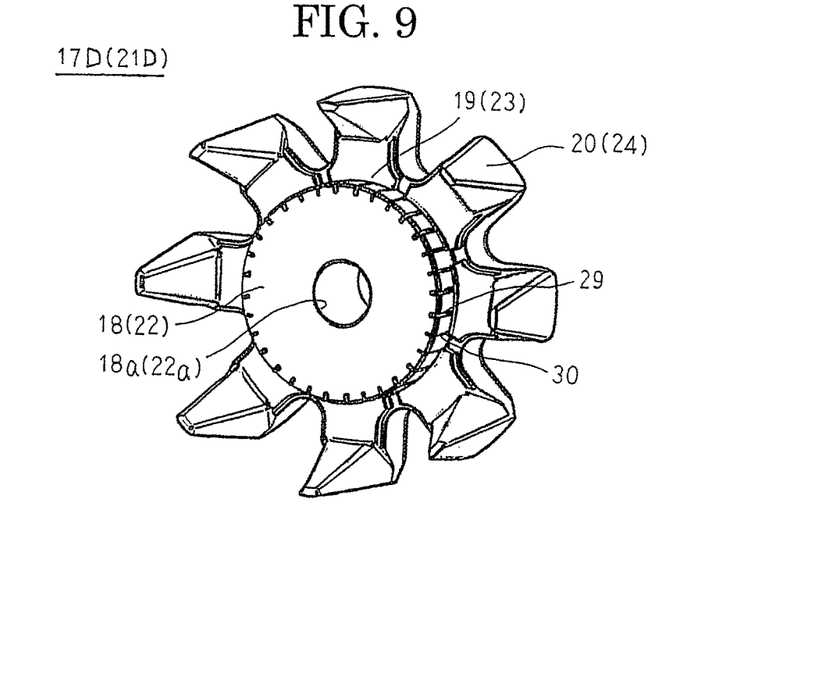
FIG. 9 is an oblique projection that shows a pole core body that constitutes part of a pole core that is used in an automotive alternator-motor according to Embodiment 5 of the present invention.

FIG. 9 is an oblique projection that shows a pole core body that constitutes part of a pole core that is used in an automotive alternator-motor according to Embodiment 5 of the present invention.

In FIG. 9, first slits 29 that have a wide groove width and first slits 30 that have a narrow groove width each have a groove cross-sectional shape that is a rectangular shape, and a groove direction oriented in an axial direction, and are formed at a uniform pitch in a circumferential direction on outer circumferential surfaces of the first and second boss portions 18 and 22 so as to alternate repeatedly two at a time.

In first and second pole core bodies 17D and 21D that are configured in this manner, because the first slits 29 and 30 are also formed on the outer circumferential surfaces of the first and second boss portions 18 and 22 so as to have groove directions oriented in an axial direction, the first slits 29 and 30 disrupt the eddy currents that flow on the outer circumferential surfaces of the first and second boss portions 18 and 22, reducing the eddy currents, and enabling responsiveness of field magnetic flux to be improved. Furthermore, because the slit portions that are formed on the outer circumferential surfaces of the first and second boss portions 18 and 22 are constituted by pairs of first and second slits 29 and 30, forces that act on the slit portions as a result of centrifugal forces that act on the first and second claw-shaped magnetic pole portions 20 and 24 are distributed, enabling resistance of the rotor to centrifugal forces to be increased.

Embodiment 6

Figure 10:
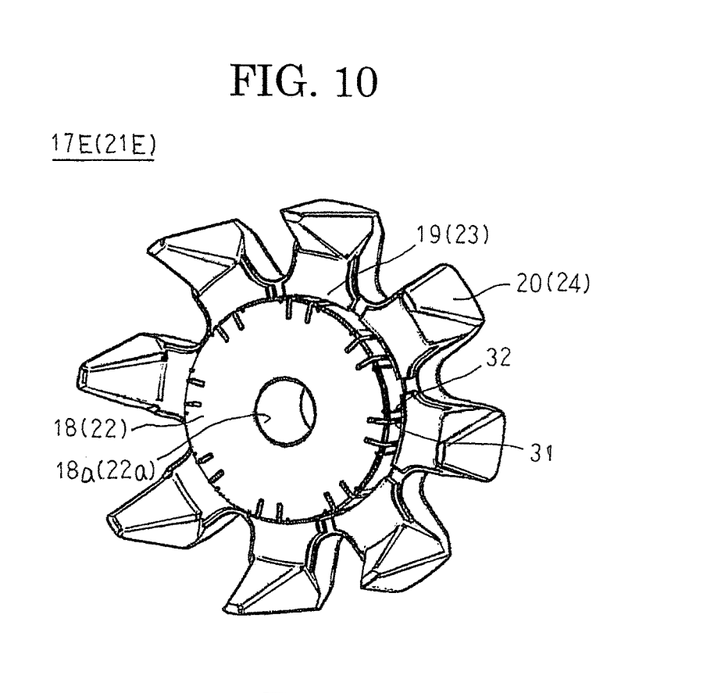
FIG. 10 is an oblique projection that shows a pole core body that constitutes part of a pole core that is used in an automotive alternator-motor according to Embodiment 6 of the present invention.

FIG. 10 is an oblique projection that shows a pole core body that constitutes part of a pole core that is used in an automotive alternator-motor according to Embodiment 6 of the present invention.

In FIG. 10, first slits 31 that have a wide groove width and a deep groove depth and first slits 32 that have a narrow groove width and a shallow groove depth each have a groove cross-sectional shape that is a rectangular shape, and a groove direction oriented in an axial direction, and are formed at a nonuniform pitch in a circumferential direction on outer circumferential surfaces of the first and second boss portions 18 and 22 so as to alternate repeatedly two at a time.

In first and second pole core bodies 17E and 21E that are configured in this manner, because the first slits 31 and 32 are also formed on the outer circumferential surfaces of the first and second boss portions 18 and 22 so as to have groove directions oriented in an axial direction, the first slits 31 and 32 disrupt the eddy currents that flow on the outer circumferential surfaces of the first and second boss portions 18 and 22, enabling the eddy currents to be reduced. Furthermore, because the first slits 31 and 32 are formed on the outer circumferential surfaces of the first and second boss portions 18 and 22 at a nonuniform pitch in a circumferential direction, spacing between the slits is at a nonuniform pitch in the circumferential direction, making the eddy currents that are generated different, because the pathway length of the eddy currents that flow on the outer circumferential surface is different among the slits. Thus, the eddy current suppressing effects can be adjusted by modifying the slit pitch.

Moreover, in Embodiments 5 and 6 above, the first slits are formed on the outer circumferential surfaces of the boss portions so as to have different groove widths, groove depths, and slit spacings, but the groove widths, the groove depths, and the slit spacings of the first slits are not limited to those in Embodiments 5 and 6 provided that they are formed so as to disrupt the pathways of the eddy currents that flow on the outer circumferential surfaces of the boss portions. In cases in which eddy currents flow so as to be concentrated in specific regions on the outer circumferential surfaces of the boss portions, the eddy currents can be reduced effectively if the first slits are formed at a nonuniform pitch in a circumferential direction so as to be disposed densely in the regions in question.

Embodiment 7

Figure 11:
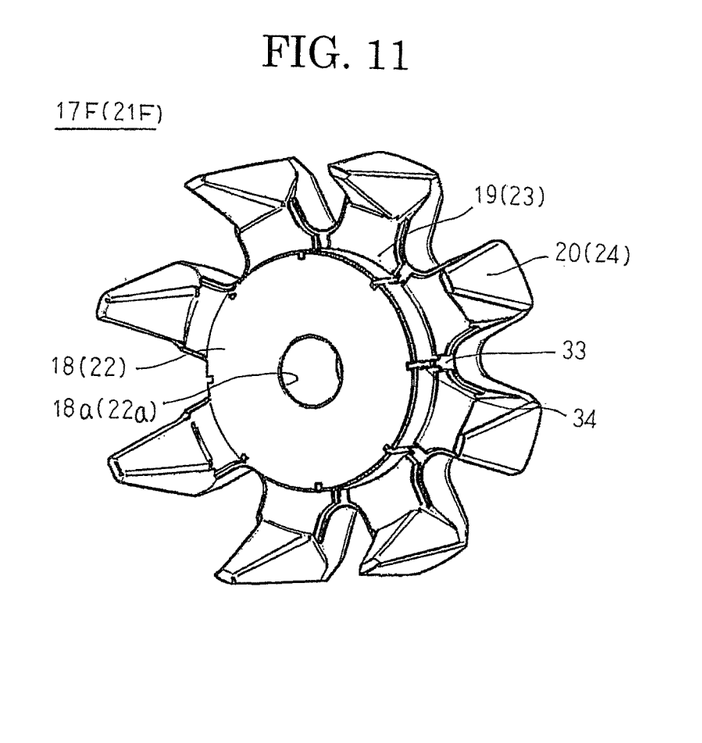
FIG. 11 is an oblique projection that shows a pole core body that constitutes part of a pole core that is used in an automotive alternator-motor according to Embodiment 7 of the present invention.

FIG. 11 is an oblique projection that shows a pole core body that constitutes part of a pole core that is used in an automotive alternator-motor according to Embodiment 7 of the present invention.

In FIG. 11, detent recess portions 33 are recessed into a surface near a second axial end of a claw crotch portion of a first yoke portion 19 that is positioned between adjacent first claw-shaped magnetic pole portions 20 of a first pole core body 17F. Similarly, detent recess portions 33 are recessed into a surface near a first axial end of a claw crotch portion of a second yoke portion 23 that is positioned between adjacent second claw-shaped magnetic pole portions 24 of a second pole core body 21F. The detent recess portions 33 stop rotation of a bobbin onto which a field coil 14 is wound around a shaft by engaging projections (not shown) of the bobbin being fitted together therewith. First slits 34 that each have a groove cross-sectional shape that is a rectangular shape and a groove direction oriented in an axial direction are formed on outer circumferential surfaces of first and second boss portions 18 and 22 at a uniform pitch in a circumferential direction so as to extend from the detent recess portions 33 to axial end portions. The detent recess portions 33 and the first slits 34 are formed simultaneously in a step that produces the first and second pole core bodies 17F and 21F by a cold forging manufacturing method.

In first and second pole core bodies 17F and 21F that are configured in this manner, because the first slits 34 are also formed on the outer circumferential surfaces of the first and second boss portions 18 and 22 so as to have groove directions oriented in an axial direction, the first slits 34 disrupt the eddy currents that flow on the outer circumferential surfaces of the first and second boss portions 18 and 22, enabling the eddy currents to be reduced. Furthermore, because the first slits 34 are formed simultaneously in a step that produces the first and second pole core bodies 17F and 21F by a cold forging manufacturing method, manufacturing of the first and second pole core bodies 17F and 21F is facilitated.

Embodiment 8

Figure 12:
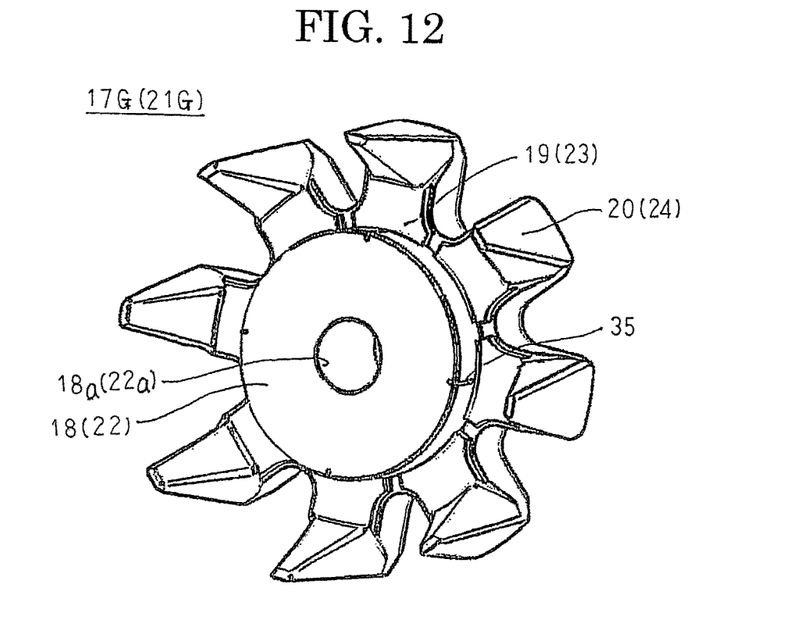
FIG. 12 is an oblique projection that shows a pole core body that constitutes part of a pole core that is used in an automotive alternator-motor according to Embodiment 8 of the present invention.

FIG. 12 is an oblique projection that shows a pole core body that constitutes part of a pole core that is used in an automotive alternator-motor according to Embodiment 8 of the present invention.

In FIG. 12, four first slits 35 that each have a groove cross-sectional shape that is a rectangular shape and a groove direction oriented in an axial direction are formed on outer circumferential surfaces of first and second boss portions 18 and 22 at a uniform angular pitch in a circumferential direction.

Moreover, the rest of the configuration is formed in a similar or identical manner to that of Embodiment 1 above.

In first and second pole core bodies 17G and 21G that are configured in this manner, because the first slits 35 are also formed on the outer circumferential surfaces of the first and second boss portions 18 and 22 so as to have groove directions oriented in an axial direction, the first slits 35 disrupt the eddy currents that flow on the outer circumferential surfaces of the first and second boss portions 18 and 22, enabling the eddy currents to be reduced. Consequently, in Embodiment 8, in which the number of first slits 35 that are formed on the outer circumferential surfaces of the first and second boss portions 18 and 22 is less than the number of first and second claw-shaped magnetic pole portions 20 and 24, eddy currents can also be reduced, and the field magnetic flux build-up can be expedited, in a similar or identical manner to Embodiment 1 above.

Because the first slits 35 are positioned within projected regions that are obtained by projecting the first and second claw-shaped magnetic pole portions 20 and 24 onto outer circumferential surfaces of the first and second boss portions 18 and 22 from radially outside, deterioration in performance of resistance of the first and second claw-shaped magnetic pole portions 20 and 24 to centrifugal forces that results from the formation of the first slits 35 can also be suppressed in Embodiment 8.

Moreover, in each of the above embodiments, first slits that are formed on outer circumferential surfaces of first and second boss portions have groove directions in an axial direction, but the first slits that are formed on the outer circumferential surfaces of the first and second boss portions 18 and 22 may have groove directions that are inclined relative to the axial direction.

In each of the above embodiments, groove cross-sectional shapes of the first and second slits that are formed on the outer circumferential surfaces and the butted surfaces of the first and second boss portions are rectangular shapes, but the groove cross-sectional shapes of the first and second slits are not limited to rectangular shapes, and may be triangular shapes, or may be shapes resembling the shapes of the tools that form the grooves, for example. In other words, the effect that can reduce eddy currents can be achieved if grooves are formed on the outer circumferential surfaces and the butted surfaces of the first and second boss portions.

In each of the above embodiments, first and second boss portions are formed into cylindrical bodies that have a shaft insertion aperture at a central position and that have a circle as an end surface, but first and second boss portions may be formed into tubular bodies that have a shaft insertion aperture at a central position and that have a polygon as an end surface.

Figure 13:
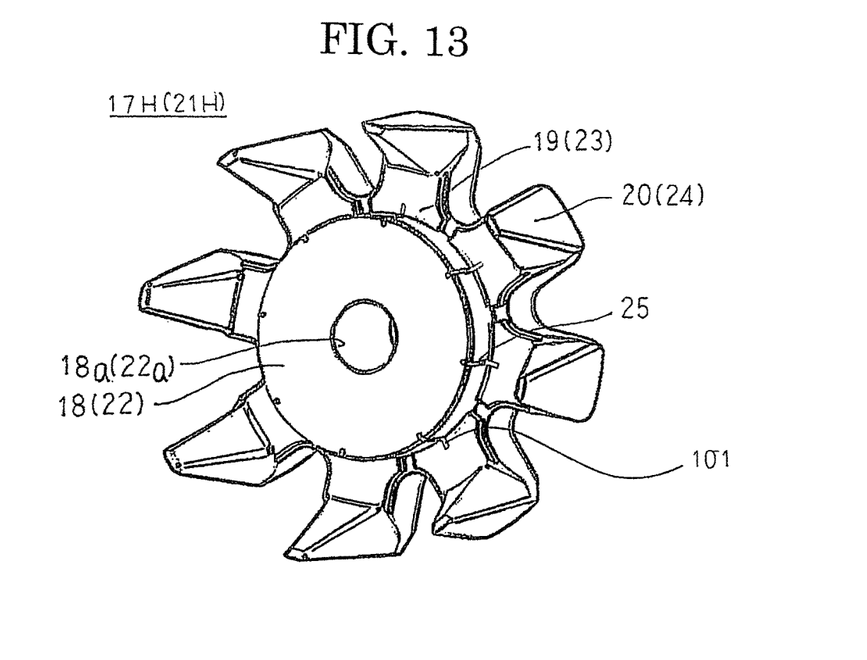
FIG. 13 is an oblique projection that shows a variation of a pole core body that constitutes part of a pole core that is used in an automotive alternator-motor according to the present invention.

In each of the above embodiments, cases in which there are no slits on a first yoke portion and a second yoke portion have been explained, but slits 101 may be formed on surfaces of a first yoke portion 19 and a second yoke portion 23 near a first boss portion 18 and a second boss portion 22, as shown in FIG. 13. In that case, effects that reduce eddy currents can be achieved by the slits 101. In addition, when forming the first slits 25 after manufacturing first and second pole core bodies 17H and 21H by a cold forging manufacturing method, no significant axial adjustment of the first slits 25 is required, facilitating manufacturing. Furthermore, in FIG. 13, circumferential positions of the first slits 25 are aligned with the slits 101, but circumferential positions of the slits 101 and the first slits 25 may be different.

In each of the above embodiments, first and second slits are explained as achieving effects that reduce eddy currents that flow due to flux change during starting in a case in which an automotive alternator-motor is operated as an electric motor, but the first and second slits also exhibit reducing effects on eddy currents that flow due to changes in field current when the field current is changed by a control command during motor operation. In addition, the first and second slits also exhibit reducing effects on eddy currents that flow due to changes in field current when operated as a generator.

In each of the above embodiments, a power circuit portion, a field circuit portion, and a controlling circuit portion are disposed inside a rear bracket, but it is not absolutely necessary for the power circuit portion, the field circuit portion, and the controlling circuit portion to be disposed inside the rear bracket, and some or all of these may be disposed outside the rear bracket. Furthermore, the power circuit portion, the field circuit portion, and the controlling circuit portion may be configured as separate parts from the automotive generator-motor, and connected electrically to the automotive generator-motor by wiring.

The invention claimed is:
1. A rotary electric machine comprising:
a rotor including:
 a pole core that comprises:
  a first pole core body including:
   a tubular first boss portion;
   a first yoke portion that is disposed so as to extend radially outward from a first axial end edge portion of said first boss portion; and a plurality of first claw-shaped magnetic pole portions that are each disposed so as to extend toward a second axial end from said first yoke portion and that are arranged at a uniform pitch in a circumferential direction; and a second pole core body including:
a tubular second boss portion;
a second yoke portion that is disposed so as to extend radially outward from a second axial end edge portion of said second boss portion; and
a plurality of second claw-shaped magnetic pole portions that are each disposed so as to extend toward a first axial end from said second yoke portion and that are arranged at a uniform pitch in a circumferential direction, said first pole core body and second pole core body being integrated by being fixed to a shaft that is inserted into central axial positions of said first boss portion and said second boss portion such that said plurality of first claw-shaped magnetic pole portions and said plurality of second claw-shaped magnetic pole portions intermesh alternately, and such that a second axial end surface of said first boss portion and a first axial end surface of said second boss portion are butted together; and a field coil that is housed inside a space that is surrounded by said first boss portion, said second boss portion, said first yoke portion, said second yoke portion, said plurality of first claw-shaped magnetic pole portions, and said plurality of second claw-shaped magnetic pole portions; and a stator that is disposed so as to surround an outer circumference of said rotor so as to have a predetermined air gap interposed, wherein:

said first pole core body and said second pole core body are produced using solid cores;

first slits are formed within projected regions that are obtained by projecting said plurality of first claw-shaped magnetic pole portions onto said outer circumferential surface of said first boss portion from radially outside and within projected regions that are obtained by projecting said plurality of second claw-shaped magnetic pole portions onto said outer circumferential surface of second boss portion from radially outside so as to disrupt pathways of eddy currents that flow on said outer circumferential surfaces of said first boss portion and said second boss portion; and third slits are formed on surfaces of said first yoke portion and said second yoke portion near said first boss portion and said second boss portion, circumferential positions of said third slits being aligned with circumferential positions of said first slits and with a longest portion of the first and second claw-shaped magnetic pole portions.

2. The rotary electric machine according to claim 1, wherein said first slits are disposed on said outer circumferential surfaces of said first boss portion and said second boss portion at a nonuniform pitch in a circumferential direction.

3. The rotary electric machine according to claim 1, wherein said first pole core body and said second pole core body are produced by forging, and said first slits are formed simultaneously during forging of said first pole core body and said second pole core body.

4. A rotary electric machine comprising:
a rotor including:
a pole core that comprises:
a first pole core body including:
a tubular first boss portion;
a first yoke portion that is disposed so as to extend radially outward from a first axial end edge portion of said first boss portion; and
a plurality of first claw-shaped magnetic pole portions that are each disposed so as to extend toward a second axial end from said first yoke portion and that are arranged at a uniform pitch in a circumferential direction; and
a second pole core body including:
a tubular second boss portion;
a second yoke portion that is disposed so as to extend radially outward from a second axial end edge portion of said second boss portion; and
a plurality of second claw-shaped magnetic pole portions that are each disposed so as to extend toward a first axial end from said second yoke portion and that are arranged at a uniform pitch in a circumferential direction, said first pole core body and second pole core body being integrated by being fixed to a shaft that is inserted into central axial positions of said first boss portion and said second boss portion such that said plurality of first claw-shaped magnetic pole portions and said plurality of second claw-shaped magnetic pole portions intermesh alternately, and such that a second axial end surface of said first boss portion and a first axial end surface of said second boss portion are butted together; and a field coil that is wound onto a bobbin and is housed inside a space that is surrounded by said first boss portion, said second boss portion, said first yoke portion, said second yoke portion, said plurality of first claw-shaped magnetic pole portions, and said plurality of second claw-shaped magnetic pole portions; and a stator that is disposed so as to surround an outer circumference of said rotor so as to have a predetermined air gap interposed, wherein:

said first pole core body and said second pole core body are produced using solid cores;

first slits are formed within regions of said outer circumferential surface of said first boss portion that face between circumferentially adjacent first claw-shaped magnetic pole portions and within regions of said outer circumferential surface of said second boss portion that face between circumferentially adjacent second claw-shaped magnetic pole portions so as to disrupt pathways of eddy currents that flow on said outer circumferential surfaces of said first boss portion and said second boss portion;

detent recess portions are formed on a surface near an outer edge of said first boss portion on a claw crotch portion of said first yoke portion that is positioned between circumferentially adjacent first claw-shaped magnetic pole portions and on a surface near an outer edge of said second boss portion on a claw crotch portion of said second yoke portion that is positioned between circumferentially adjacent second claw-shaped magnetic pole portions, the detent recess portions stopping rotation of said bobbin, the detent recess portions being larger than the first slits; and said first pole core body and said second pole core body are produced by forging, and said first slits are formed simultaneously during forging of said first pole core body and said second pole core body.

5. The rotary electric machine according to claim 4, wherein said first slits are disposed on said outer circumferential surfaces of said first boss portion and said second boss portion at a nonuniform pitch in a circumferential direction.

6. A rotary electric machine comprising:
a rotor including:
a pole core that comprises:
a first pole core body including:
a tubular first boss portion;
a first yoke portion that is disposed so as to extend radially outward from a first axial end edge portion of said first boss portion; and
a plurality of first claw-shaped magnetic pole portions that are each disposed so as to extend toward a second axial end from said first yoke portion and that are arranged at a uniform pitch in a circumferential direction; and
a second pole core body including:
a tubular second boss portion;
a second yoke portion that is disposed so as to extend radially outward from a second axial end edge portion of said second boss portion; and
a plurality of second claw-shaped magnetic pole portions that are each disposed so as to extend toward a first axial end from said second yoke portion and that are arranged at a uniform pitch in a circumferential direction,
said first pole core body and second pole core body being integrated by being fixed to a shaft that is inserted into central axial positions of said first boss portion and said second boss portion such that said plurality of first claw-shaped magnetic pole portions and said plurality of second claw-shaped magnetic pole portions intermesh alternately, and such that a second axial end surface of said first boss portion and a first axial end surface of said second boss portion are butted together; and
a field coil that is housed inside a space that is surrounded by said first boss portion, said second boss portion, said first yoke portion, said second yoke portion, said plurality of first claw-shaped magnetic pole portions, and said plurality of second claw-shaped magnetic pole portions; and
a stator that is disposed so as to surround an outer circumference of said rotor so as to have a predetermined air gap interposed,
wherein:
said first pole core body and said second pole core body are produced using solid cores;
first slits are formed on outer circumferential surfaces of said first boss portion and said second boss portion so as to disrupt pathways of eddy currents that flow on said outer circumferential surfaces of said first boss portion and said second boss portion; and
second slits are formed on said second axial end surface of said first boss portion and said first axial end surface of said second boss portion so as to disrupt pathways of eddy currents that flow on said second axial end surface of said first boss portion and said first axial end surface of said second boss portion.

7. The rotary electric machine according to claim 6, wherein said first pole core body and said second pole core body are produced by forging, and said first slits and said second slits are formed simultaneously during forging of said first pole core body and said second pole core body.

\* \* \* \* \*